United States Patent
Zhang et al.

(10) Patent No.: US 11,132,128 B2
(45) Date of Patent: Sep. 28, 2021

(54) SYSTEMS AND METHODS FOR DATA PLACEMENT IN CONTAINER-BASED STORAGE SYSTEMS

(71) Applicant: Veritas Technologies LLC, Mountain View, CA (US)

(72) Inventors: Xianbo Zhang, Plymouth, MN (US); Weibao Wu, Vadnais Heights, MN (US); Jeffrey Van Voorst, Shakopee, MN (US); Haigang Wang, Shoreview, MN (US); Yong Yang, Beijing (CH); Shuangmin Zhang, Beijing (CH)

(73) Assignee: Veritas Technologies LLC, Santa Clara, CA (US)

( * ) Notice: Subject to any disclaimer, the term of this patent is extended or adjusted under 35 U.S.C. 154(b) by 99 days.

(21) Appl. No.: 15/469,157

(22) Filed: Mar. 24, 2017

(65) Prior Publication Data

US 2018/0275886 A1    Sep. 27, 2018

(51) Int. Cl.
*G06F 3/06*      (2006.01)
*G06F 12/0862*   (2016.01)

(52) U.S. Cl.
CPC .......... *G06F 3/0608* (2013.01); *G06F 3/0611* (2013.01); *G06F 3/0643* (2013.01); *G06F 3/0644* (2013.01); *G06F 3/0685* (2013.01); *G06F 12/0862* (2013.01)

(58) Field of Classification Search
CPC .... G06F 3/0608; G06F 3/0611; G06F 3/0643; G06F 3/0644; G06F 3/0685; G06F 12/0862

See application file for complete search history.

(56) References Cited

U.S. PATENT DOCUMENTS

| | | | | |
|---|---|---|---|---|
| 5,021,946 A | * | 6/1991 | Korty | G06F 16/9017 |
| 8,572,055 B1 | * | 10/2013 | Wu | G06F 17/30097 |
| | | | | 707/697 |
| 9,383,924 B1 | * | 7/2016 | Fullbright | G06F 3/0608 |
| 9,626,253 B1 | * | 4/2017 | Zhang | G06F 11/1453 |

(Continued)

OTHER PUBLICATIONS

Memory Management by Paul Krzyzanowski, Rutgers 2012 (Year: 2012).*

(Continued)

*Primary Examiner* — Paul M Knight
(74) *Attorney, Agent, or Firm* — FisherBroyles, LLP

(57) ABSTRACT

The disclosed computer-implemented method for data placement in container-based storage systems may include (i) identifying a file stored within a container-based storage system, where the container-based storage system stores the file as data segments within containers, (ii) receiving, in response to a write operation directed to the file, a request to store within the container-based storage system a new data segment generated by the write operation, (iii) describing the file in terms of a plurality of consecutive slabs, (iv) determining that the new data segment falls within a specified slab, and (v) fulfilling the request to store the new data segment within the container-based storage system by storing the new data segment in a designated container that corresponds to the specified slab in response to determining that the new data segment falls within the specified slab. Various other methods, systems, and computer-readable media are also disclosed.

20 Claims, 7 Drawing Sheets

(56) References Cited

U.S. PATENT DOCUMENTS

| | | | |
|---|---|---|---|
| 10,248,617 B2* | 4/2019 | Starr | G06F 16/113 |
| 2010/0228708 A1* | 9/2010 | Lehr | G06F 16/10 |
| | | | 707/705 |
| 2011/0022811 A1* | 1/2011 | Kirihata | G06F 3/0608 |
| | | | 711/162 |
| 2011/0161291 A1* | 6/2011 | Taleck | G06F 11/1458 |
| | | | 707/622 |
| 2011/0167096 A1* | 7/2011 | Guo | G06F 3/0652 |
| | | | 707/816 |
| 2011/0231631 A1* | 9/2011 | Matsuzawa | G06F 3/0607 |
| | | | 711/209 |
| 2013/0311739 A1* | 11/2013 | Kawakami | G06F 3/0683 |
| | | | 711/165 |
| 2014/0149472 A1* | 5/2014 | Wang | G06F 17/30117 |
| | | | 707/813 |
| 2014/0258788 A1* | 9/2014 | Maruyama | G06F 11/3452 |
| | | | 714/47.3 |
| 2014/0280397 A1* | 9/2014 | Rajpal | G06F 16/13 |
| | | | 707/825 |
| 2015/0220271 A1* | 8/2015 | Yoshida | G06F 3/0604 |
| | | | 711/166 |
| 2015/0339307 A1* | 11/2015 | Hultgren | G06F 3/0481 |
| | | | 707/724 |

OTHER PUBLICATIONS

The Slab Allocator: An Object-Caching Kernel Memory Allocator by Bonwick; Sun Microsystems 1994 (Year: 1994).*
Anatomy of the Linux slab allocator by Jones (Year: 2007).*
Avoiding the Disk Bottleneck in the Data Domain Deduplication File System by Zhu; USENIX (Year: 2008).*

* cited by examiner

SYSTEMS AND METHODS FOR DATA PLACEMENT IN CONTAINER-BASED STORAGE SYSTEMS

BACKGROUND

Deduplicated data systems are often able to reduce the amount of space required to store files by recognizing redundant data patterns. For example, a deduplicated data system may reduce the amount of space required to store similar files by dividing the files into data segments and storing only unique data segments. In this example, each deduplicated file may simply consist of a list of data segments that make up the file.

Unfortunately, the use of deduplicated data systems may negatively impact input/output performance. For example, reading logically contiguous data from a file stored in a deduplicated data system may involve reading scattered deduplicated data segments stored in various non-contiguous physical locations within the deduplicated data system and/or unassociated logical locations within the deduplicated data system (e.g., within separate containers). Thus, the advantages of storage savings provided by deduplicated data systems may, in traditional systems, be offset by disadvantages in poor input/output performance. Input/output performance is a key metric in the realm of storage; poor input/output performance may cause anything from the inconvenience of increased latency, to an end user to wasted computing resources, to the failure of systems with time objective requirements.

The instant disclosure, therefore, identifies and addresses a need for systems and methods for data placement in container-based storage systems.

SUMMARY

As will be described in greater detail below, the instant disclosure describes various systems and methods for data placement in container-based storage systems by logically dividing files into slabs and selecting containers for storing data segments from files according to the slabs to which the data segments pertain, such that data segments from the same file slabs are stored in the same containers.

In one example, a computer-implemented method for data placement in container-based storage systems may include (i) identifying a file stored within a container-based storage system, wherein the container-based storage system stores the file as a group of data segments, each data segment within the data segments being stored within one of a group of containers, (ii) receiving, in response to a write operation directed to the file, a request to store within the container-based storage system a new data segment generated by the write operation, (iii) describing the file in terms of a group of consecutive slabs, each slab corresponding to a group of consecutive data segments within the file, (iv) determining that the new data segment falls within a specified slab within the consecutive slabs, and (v) fulfilling the request to store the new data segment within the container-based storage system by storing the new data segment in a designated container within the containers that corresponds to the specified slab in response to determining that the new data segment falls within the specified slab.

In one embodiment, the write operation directed to the file may include a random access write operation and a data segment at the location of the new data segment may have been previously stored within the container-based storage system in a different container than the designated container.

In one embodiment, the computer-implemented method may further include (i) receiving, in response to a second write operation directed to the file, a second request to store within the container-based storage system a second data segment generated by the second write operation, (ii) determining that the second new data segment falls within a second slab within the consecutive slabs, and (iii) fulfilling the request to store the second data segment within the container-based storage system by storing the second data segment in a second container within the containers that corresponds to the second slab in response to determining that the second data segment falls within the second slab, thereby storing the new data segment and the second data segment in different containers based on the new data segment and the second data segment falling within different slabs.

In one embodiment, the computer-implemented method may further include (i) receiving, in response to a third write operation directed to the file, a third request to store within the container-based storage system a third data segment generated by the third write operation, (ii) determining that the third data segment falls within the specified slab within the consecutive slabs, and (iii) fulfilling the request to store the third data segment within the container-based storage system by storing the third data segment in the designated container within the containers that was used to store the new data segment and that corresponds to the specified slab in response to determining that the third new data segment falls within the third slab, thereby storing both the new data segment and the third data segment in the specified container based on both the new data segment and the third data segment both falling within the specified slab.

In one embodiment, the computer-implemented method may further include (i) receiving, in response to a read operation directed to the file and encompassing the new data segment, a request to retrieve the new data segment from the container-based storage system, (ii) prefetching the designated container that stores the new data segment in response to receiving the request to retrieve the new data segment and thereby caching additional data beyond the new data segment, and (iii) fulfilling an additional request to retrieve an additional data segment that also falls within the specified slab and is therefore also stored within the designated container by reading from the cached additional data.

In some examples, the computer-implemented method may further include storing a group of small files that each fall below a predetermined size within a common container in the container-based storage system based on the small files falling below the predetermined size.

In some examples, storing the small files within the common container may include (i) temporarily holding write operations to a small file within the small files in a buffer, (ii) determining that a size of the small file falls below the predetermined size, and (iii) writing the small file to the common container in response to determining that the size of the small file falls below the predetermined size.

In one embodiment, the container-based storage system includes a deduplicated data storage system and the new data segment is stored in the designated container in response to determining that the new data segment is unique within the deduplicated data storage system.

In one embodiment, the computer-implemented method may further include (i) determining that the file has been removed from the deduplicated data storage system, (ii) determining that no files stored by the deduplicated data storage system reference data segments stored within the designated container, and (iii) freeing space allocated to the designated container in response to determining that no files stored by the deduplicated data storage system reference data segments stored within the designated container.

In one embodiment, a system for implementing the above-described method may include (i) an identification module, stored in memory, that identifies a file stored within a container-based storage system, wherein the container-based storage system stores the file as a group of data segments, each data segment within the data segments being stored within one of a group of containers, (ii) a receiving module, stored in memory, that receives, in response to a write operation directed to the file, a request to store within the container-based storage system a new data segment generated by the write operation, (iii) a description module, stored in memory, that describes the file in terms of a group of consecutive slabs, each slab corresponding to a group of consecutive data segments within the file, (iv) a determination module, stored in memory, that determines that the new data segment falls within a specified slab within the consecutive slabs, (v) a fulfilling module, stored in memory, that fulfils the request to store the new data segment within the container-based storage system by storing the new data segment in a designated container within the containers that corresponds to the specified slab in response to determining that the new data segment falls within the specified slab, and (vi) at least one physical processor configured to execute the identification module, the receiving module, the description module, the determination module, and the fulfilling module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a file stored within a container-based storage system, wherein the container-based storage system stores the file as a group of data segments, each data segment within the data segments being stored within one of a group of containers, (ii) receive, in response to a write operation directed to the file, a request to store within the container-based storage system a new data segment generated by the write operation, (iii) describe the file in terms of a group of consecutive slabs, each slab corresponding to a group of consecutive data segments within the file, (iv) determine that the new data segment falls within a specified slab within the consecutive slabs, and (v) fulfill the request to store the new data segment within the container-based storage system by storing the new data segment in a designated container within the containers that corresponds to the specified slab in response to determining that the new data segment falls within the specified slab.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
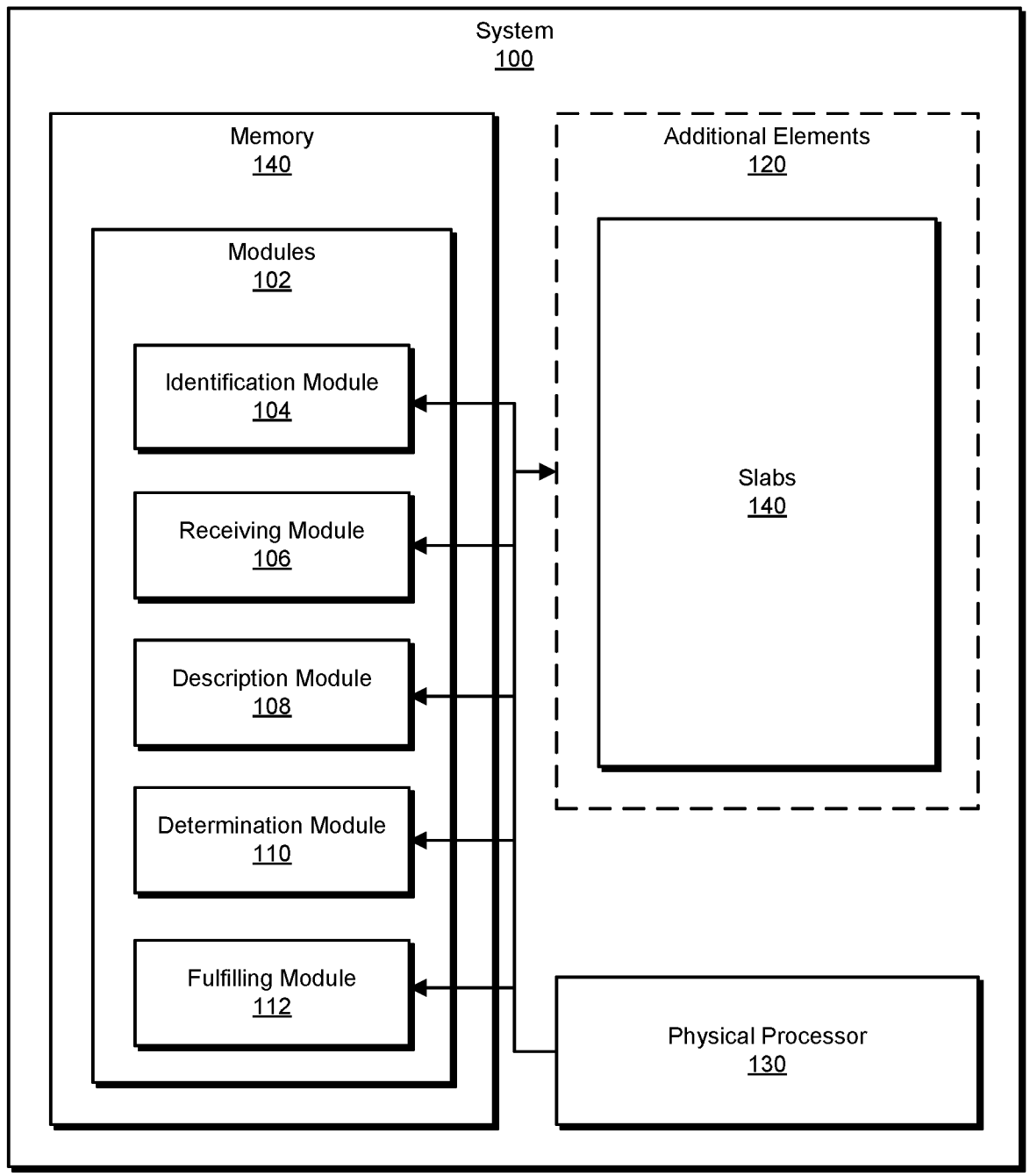
FIG. 1 is a block diagram of an example system for data placement in container-based storage systems.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for data placement in container-based storage systems. As will be explained in greater detail below, by logically dividing files into slabs and selecting containers for storing data segments from files according to the slabs to which the data segments pertain (i.e., such that data segments from the same file slab are stored in the same container or set of containers), the systems and methods described herein may improve the performance of input/output operations performed on the files. For example, these systems may prefetch containers corresponding to a slab within a file when a read operation targets the slab, thereby potentially improving the performance of sequential read operations on a file. Furthermore, in some examples, the systems and methods described herein may store multiple small files in the same container, thereby potentially achieving better write performance.

Moreover, the systems and methods described herein may improve the functioning of one or more computing devices. For example, the systems and methods described herein may improve the functioning of a container-based storage system by improving the input/output performance of the container-based storage system. In addition, the systems and methods described herein may improve the functioning of a computing device that relies on a container-based storage system for storage by improving the input/output performance of the computing device and/or of the container-based storage system. In some examples, the systems and methods described herein may improve the functioning of a container-based storage system and/or a computing device that relies on a container-based storage system for storage by reducing the computing resources consumed by the computing device and/or the container-based storage system to perform storage operations and/or to determine where to store data segments.

Figure 2:
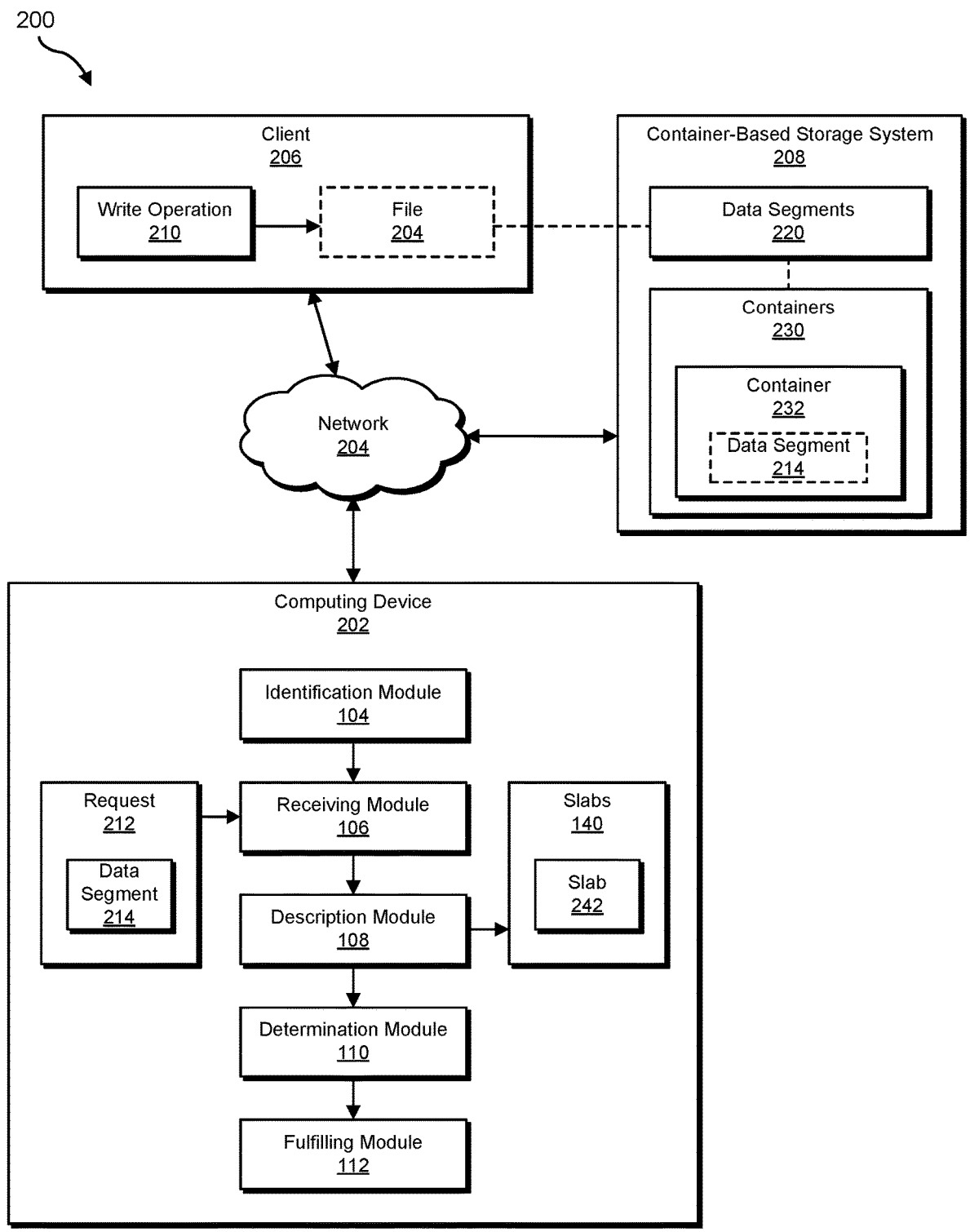
FIG. 2 is a block diagram of an additional example system for data placement in container-based storage systems.

The following will provide, with reference to FIGS. 1-2, detailed descriptions of example systems for data placement in container-based storage systems. Detailed descriptions of corresponding computer-implemented methods will also be provided in connection with FIG. 3. In addition, detailed descriptions of example files will be provided in connection with FIGS. 4-5. Detailed descriptions of example containers for storing data segments will be provided in connection with FIGS. 6-7.

FIG. 1 is a block diagram of example system 100 for data placement in container-based storage systems. As illustrated in this figure, example system 100 may include one or more modules 102 for performing one or more tasks. For example, and as will be explained in greater detail below, example system 100 may include an identification module 104 that identifies a file stored within a container-based storage system, wherein the container-based storage system stores the file as a plurality of data segments, each data segment within the plurality of data segments being stored within one of a plurality of containers. Example system 100 may additionally include a receiving module 106 that receives, in response to a write operation directed to the file, a request to store within the container-based storage system a new data segment generated by the write operation. Example system 100 may also include a description module 108 that describes the file in terms of a plurality of consecutive slabs, each slab corresponding to a plurality of consecutive data segments within the file. Example system 100 may additionally include a determination module 110 that determines that the new data segment falls within a specified slab within the plurality of consecutive slabs. Example system 100 may also include a fulfilling module 112 that fulfils the request to store the new data segment within the container-based storage system by storing the new data segment in a designated container within the plurality of containers that corresponds to the specified slab in response to determining that the new data segment falls within the specified slab. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, client 206, and/or container-based storage system 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate data placement in container-based storage systems. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements, such as slabs 140. Slabs 140 generally represent any type or form of logical division of one or more files.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a client 206 and/or a container-based storage system 208 via a network 204. In one example, all or a portion of the functionality of modules 102 may be performed by computing device 202, client 206, and/or any other suitable computing system. As will be described in greater detail below, one or more of modules 102 from FIG. 1 may, when executed by at least one processor of computing device 202, client 206, and/or container-based storage system 208, enable computing device 202, client 206, and/or container-based storage system 208 to efficiently place data segments in container-based storage system 208.

Computing device 202 generally represents any type or form of computing device capable of reading computer-executable instructions. In one example, computing device 202 may represent a storage appliance. Additional examples of computing device 202 include, without limitation, storage servers, database servers, application servers, and/or web servers configured to run certain software applications and/or provide various storage, database, and/or web services. Although illustrated as a single entity in FIG. 2, computing device 202 may include and/or represent a plurality of servers that work and/or operate in conjunction with one another.

Client 206 generally represents any type or form of computing device capable of reading computer-readable instructions. In one example, client 206 may represent a computing device that uses a container-based storage system for storage. Additional examples of client 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Container-based storage system 208 generally represents any type or form of computing device capable of reading computer-executable instructions. In one example, container-based storage system 208 may represent a deduplicated data storage system. Additional examples of container-based storage system 208 include, without limitation, storage servers, database servers, application servers, and/or web servers configured to run certain software applications and/or provide various storage, database, and/or web services. Although illustrated as a single entity in FIG. 2, container-based storage system 208 may include and/or represent a plurality of servers that work and/or operate in conjunction with one another. In some examples, container-based storage system 208 may include portions of computing device 202. Additionally or alternatively, client 206 may include portions of computing device 202.

Network 204 generally represents any medium or architecture capable of facilitating communication or data transfer. In one example, network 204 may facilitate communication between computing device 202, client 206, and/or container-based storage system 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), a Storage Area Network (SAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
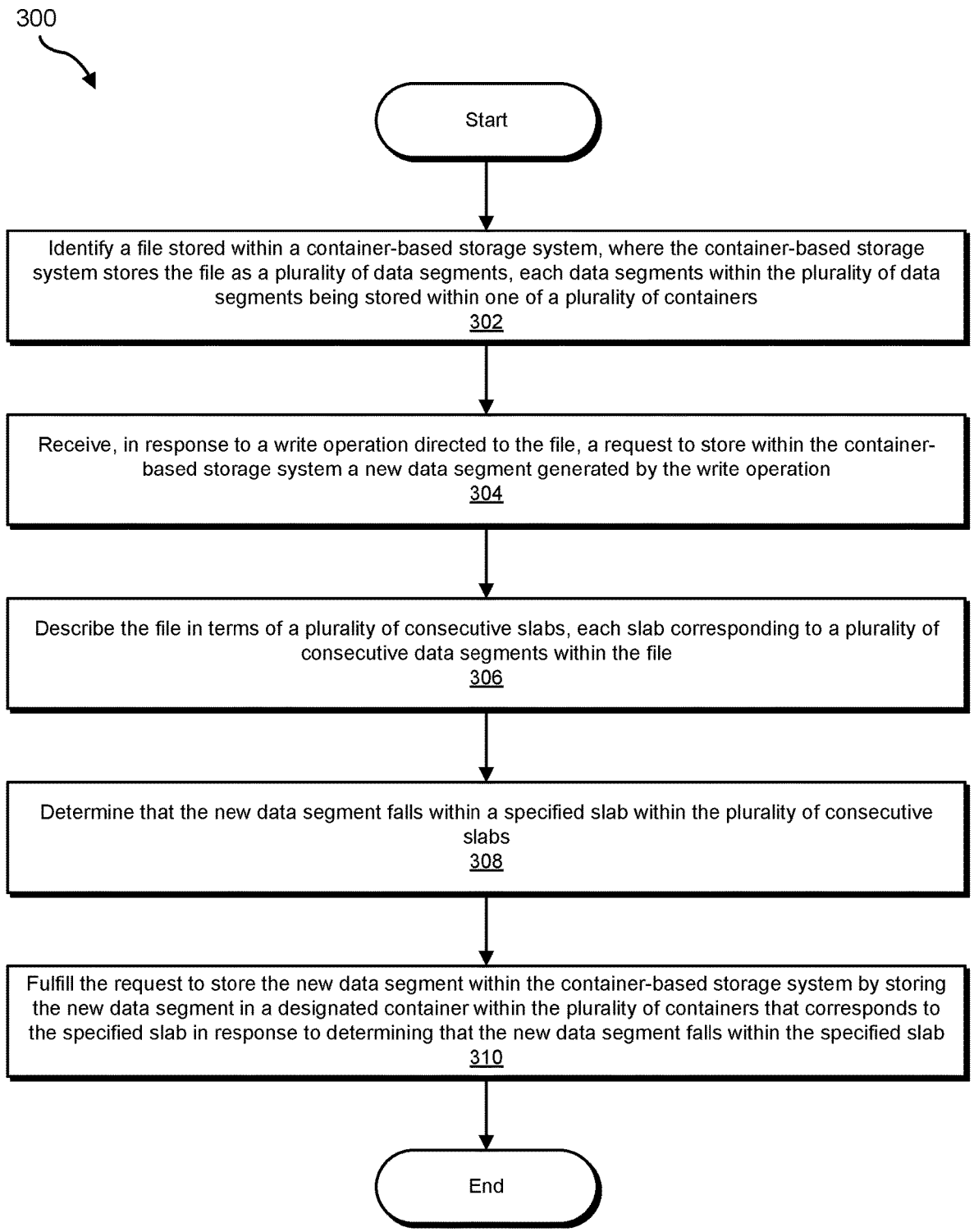
FIG. 3 is a flow diagram of an example method for data placement in container-based storage systems.

FIG. 3 is a flow diagram of an example computer-implemented method 300 for data placement in container-based storage systems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a file stored within a container-based storage system, where the container-based storage system stores the file as a plurality of data segments, each data segment within the plurality of data segments being stored within one of a plurality of containers. For example, identification module 104 may, as part of computing device 202 in FIG. 2, identify file 204 stored within container-based storage system 208, where container-based storage system 208 stores file 204 as data segments 220, each data segment within data segments 220 being stored within one of containers 230.

The term "file," as used herein, may refer to any suitable unit of data, including, without limitation, a file, data object, extent, database, database entry, and/or electronic document. In some examples, the term "file" may refer to a data object that may be stored via a deduplicated data storage system (e.g., a data object that may be segmented, whose unique data segments may be stored within the deduplicated data storage system, and that may be subsequently stored as a series of references to data segments stored by the deduplicated data storage system).

The term "container-based storage system," as used herein, generally refers to any storage system in which stored data is distributed amongst a set of discrete containers. For example, a container-based storage system may store data as a collection of data segments, where each data segment is stored in a particular container. In some examples, the term "container-based storage system" may refer to a deduplicated data storage system.

The term "container," as used herein, generally refers to any data structure and/or discrete location in which a set of data may be collectively stored. In some examples, a container may be implemented as a file and/or a set of files. Additionally or alternatively, a container may be implemented as a database and/or a predetermined range of storage locations. In some examples, the term As used herein, the term "data segment" may refer to any discrete unit of data. In some examples, the term "data segment" may refer to a unit of data of a fixed size. In some examples, the term "data segment" may refer to a smallest unit of data handled by a storage system at a particular level of abstraction (e.g., for purposes of journaling and/or deduplication). Examples of a data segment include, but are not limited to, a portion of a file, a portion of an image, a data block, a portion of a data stream, and/or a database entry. In some examples, the term "data segment" may refer to any unit of data that may be stored as a deduplicated unit within a deduplicated data system. In some examples, a deduplicated data system may track and identify unique data segments by generating and/or storing fingerprints derived from the data segments (e.g., values derived from data segments that, with high probability, uniquely identify their respective data segments).

As mentioned earlier, in some examples, the container-based storage system may include and/or implement a deduplicated data storage system. In these examples, systems described herein may store a data segment in a container in response to determining that the data segment is unique within the deduplicated data storage system.

Identification module 104 may identify the file stored within the container-based storage system in any suitable context. For example, identification module 104 may identify the file in response to receiving a request to store a data segment for the file within the container-based storage system. In some examples, identification module 104 may identify the file by identifying a data structure that represents the file that that references one or more data segments stored in one or more containers within a container-based storage system.

In some examples, identification module 104 may also identify a size of the file. For example, identification module 104 may determine that a size of the file is above a predetermined threshold before the systems described herein perform one or more of the steps described herein (e.g., dividing the file into slabs and assigning new data segments written to the file to containers based on the slabs into which the new data segments fall). Additionally or alternatively, identification module 104 may determine that a size of the file falls below a predetermined threshold and may apply different container selection standards for storing data segments of the file based on the size of the file falling below the predetermined threshold.

Figure 4:
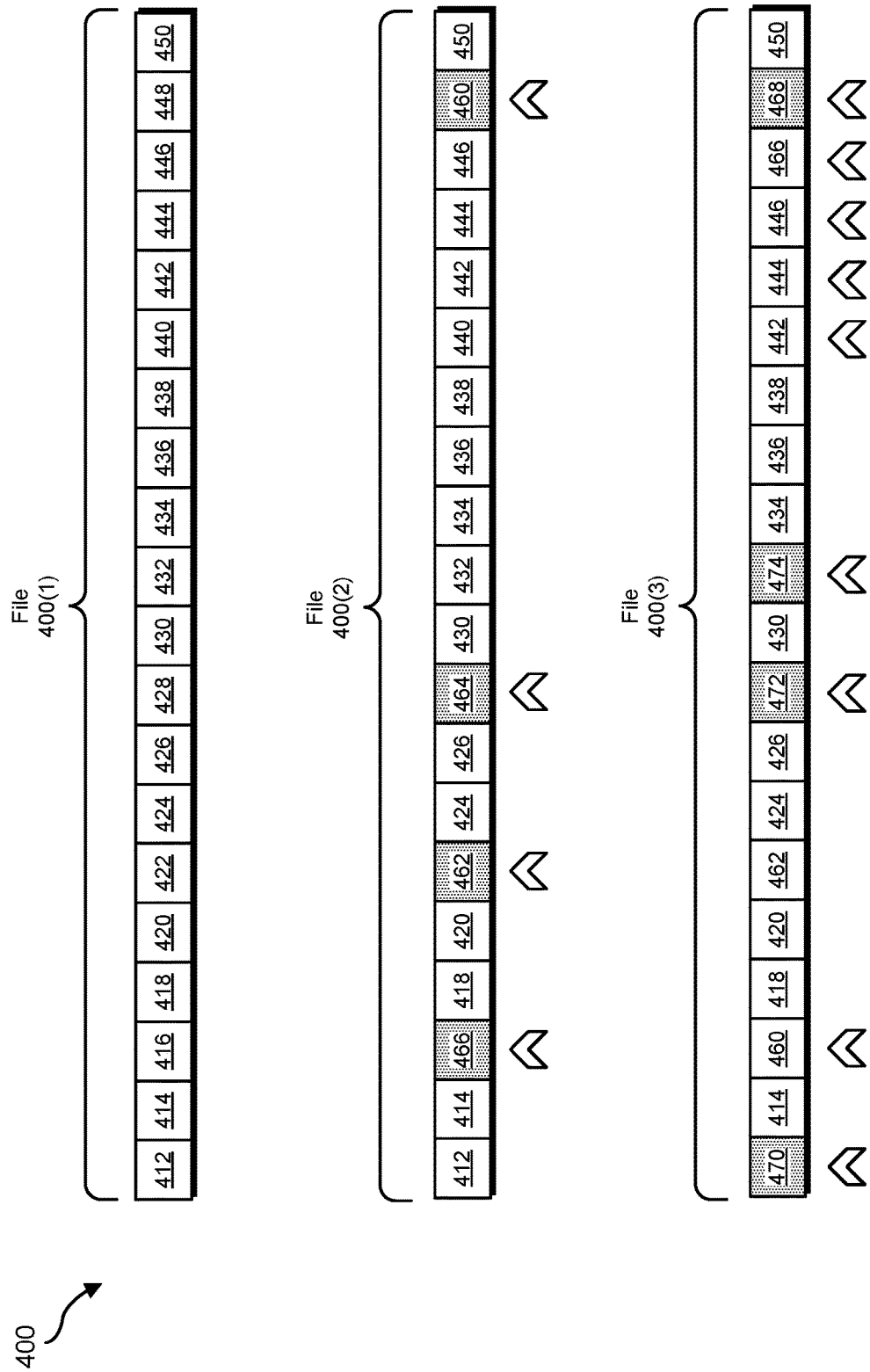
FIG. 4 is an illustration of an example file.

FIG. 4 illustrates an example file 400 in three successive states: file 400(1) (e.g., an original version of file 400), file 400(2) (e.g., an altered version of file 400 with certain portions being overwritten), and file 400(3) (e.g., a later altered version of file 400 with additional portions being overwritten). In one example, identification module 104 may, at step 302, identify file 400.

Returning to FIG. 3, at step 304, one or more of the systems described herein may receive, in response to a write operation directed to the file, a request to store within the container-based storage system a new data segment generated by the write operation. For example, receiving module 106 may, as part of computing device 202 in FIG. 2, receive, in response to write operation 210 directed to file 204, request 212 to store within container-based storage system 208 a data segment 214 generated by write operation 210.

The term "write operation," as used herein, generally refers to any request, instruction, and/or attempt to introduce data to a file by adding to and/or modifying the file. For example, a write operation may include an operation initiated and/or carried out by a file system that manages the storage of the file.

In some examples, as will be explained in greater detail below, the write operation directed to the file may include a random access write operation. For example, the write operation may be directed to a location within a file that does not sequentially follow from the location of a previous write operation to the file. Using FIG. 4 as an example, file 400(1) may represent an initial version of file 400 and may have been written with sequential write operations that sequentially generated data segments 412-450. However, later write operations to file 400 may occur out of order. For example, as shown in file 400(2), a write operation may generate a data segment 460 near the end of file 400, and then subsequent write operations may generate data segments 462, 464, and 466, stored in varying locations of file 400 (and, e.g., where the sequence of locations in which the data segments are stored differs from the sequence in which the write operations that generated the data segments are performed).

Receiving module 106 may receive the request to store the new data segment within the container-based storage system in any suitable context. For example, receiving module 106 may receive the new data segment reflecting the write operation and determine whether an instance of the new data segment already exists within the container-based storage system (e.g., whether an identical data segment is already stored in a container within the container-based storage system). Additionally or alternatively, receiving module 106 may receive an instruction to store the new data segment within the container-based storage system (e.g., in response to a previous determination that no instance of the data segment is already stored within the container-based storage system).

Returning to FIG. 3, at step 306, one or more of the systems described herein may describe the file in terms of a plurality of consecutive slabs, each slab corresponding to a plurality of consecutive data segments within the file. For example, description module 108 may, as part of computing device 202 in FIG. 2, describe file 204 in terms of a consecutive slabs 140, each slab corresponding to a plurality of consecutive data segments within file 204.

The term "slab," as used herein, generally refers to any range of a file that includes multiple data segments. In some examples, a file may be viewed as a series of consecutive slabs. In some examples, the term "slab" may refer to a range with a predetermined, fixed size. For example, a file may be viewed as a series of slabs of 64 megabytes (MB) each. Accordingly, the first slab of a file may include data with a logical offset range of 0 to 64 MB. A second slab of a file may include data with a logical offset range of 64 MB to 128 MB. A third slab of a file may include data with a logical offset range of 128 MB to 192 MB (and so forth).

Description module 108 may describe the file in terms of consecutive slabs in any of a variety of ways. For example, description module 108 may identify a predetermined slab size (e.g., 64 MB or 1 GB) and then designate any given location within a file as pertaining to a slab number that equals the offset of the given location within the file divided by the predetermined slab size and rounded down. Thus, in one example description module 108 may identify the predetermined slab size as 64 MB and determine that any location within the file with an offset between 0 and 64 MB corresponds to slab number 0, that any location within the file with an offset between 64 MB and 128 MB corresponds to slab number 1, that any location within the file with an offset between 128 MB and 192 MB corresponds to slab number 2, and so forth. In some examples, description module 108 may describe the file in terms of consecutive slabs by defining a slab as a predetermined number of consecutive data segments. For example, description module 108 may define a slab as 64 consecutive data segments. Accordingly, description module 108 may describe the first 64 data segments of a file as pertaining to a first slab, the next 64 data segments of a file as pertaining to a second slab, and so on. In some examples, description module 108 may describe the file in terms of consecutive slabs by identifying a formula, procedure, scheme, and/or mapping whereby a location and/or data segment within a file may be mapped to a specific slab.

Figure 5:
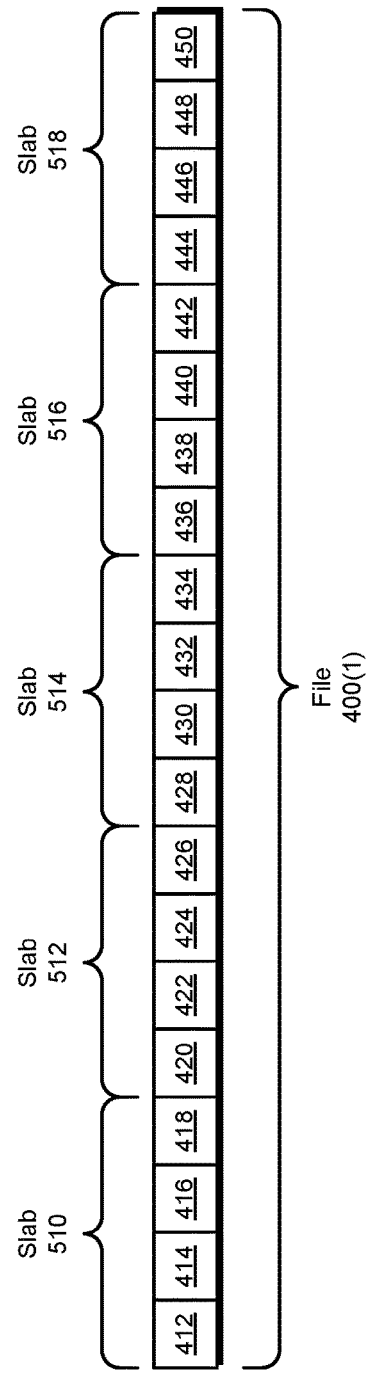
FIG. 5 is an illustration of an example file.

FIG. 5 illustrates an example slab description 500 of file 400(1). As shown in FIG. 5, description module 108 may describe file 400(1) as a sequence of five consecutive slabs: slabs 510, 512, 514, 516, and 518. Slab 510 may include the first four data segments of file 400(1), slab 512 may include the next four data segments of file 400(1), and so forth.

Returning to FIG. 3, at step 308, one or more of the systems described herein may determine that the new data segment falls within a specified slab within the plurality of consecutive slabs. For example, determination module 110 may, as part of computing device 202 in FIG. 2, determine that data segment 214 falls within a slab 242 within consecutive slabs 140.

Determination module 110 may determine that the new data segment falls within the specified slab in any suitable manner. For example, determination module 110 may apply a mapping and/or formula (e.g., as described earlier) that maps an offset within the file that corresponds to the data segment to the specified slab.

Using FIGS. 4 and 5 for an example, the systems described herein may have received a request to write a new data segment 462 to file 400 (as shown in the illustration of file 400(2) in FIG. 4). The systems described herein may also have described file 400(1) in terms of slabs 510, 512, 514, 516, and 518, as shown in FIG. 5. Accordingly, determination module 110 may determine that new data segment 462 falls within slab 512 (because, e.g., slab 512 includes the sixth data segment location within file 400).

Returning to FIG. 3, at step 310, one or more of the systems described herein may fulfill the request to store the new data segment within the container-based storage system by storing the new data segment in a designated container within the plurality of containers that corresponds to the specified slab in response to determining that the new data segment falls within the specified slab. For example, fulfilling module 112 may, as part of computing device 202 in FIG. 2, fulfill request 212 to store data segment 214 within container-based storage system 208 by storing data segment 214 in a container 232 within containers 230 that corresponds to slab 242 in response to determining that data segment 214 falls within slab 242.

Fulfilling module 112 may fulfill the request to store the new data segment within the container-based storage in any suitable manner. For example, fulfilling module 112 may determine that the designated container corresponding to the specified slab has room to store the new data segment and may therefore store the new data segment in the designated container. In some examples, fulfilling module 112 may determine that a container for storing data segments that fall within the specified slab is full and may, therefore, create and/or identify a new container designated for storing data segments that fall within the specified slab.

In some examples, as discussed earlier, the write operation directed to the file may include a random access write operation. In these examples, a data segment at the location of the new data segment may have previously stored within the container-based storage system in a different container than the designated container. For example, a data segment within a deduplicated data system may be referenced by a file multiple times and/or be referenced by multiple files. Accordingly, a data segment may be stored in only one container, and one or more instances of the data segment in one or more files may fall within slabs that do not correspond to the container that stores the data segment. Thus, when fulfilling module 112 stores the new data segment within the designated container based on the new data segment falling within the specified slab, the new data segment may be stored in a different container (e.g., the designated container may differ from the container storing the data segment replaced within the file).

In some examples, the systems described herein may store data segments received successively received for storage in containers based on the slab of a file in which the data segments fall (rather than, e.g., selecting containers solely based on whether space is available in a container). In one example, the systems described herein may (i) receive, in response to a second write operation directed to the file, a second request to store within the container-based storage system a second data segment generated by the second write operation and (ii) determine that the second new data segment falls within a second slab within the plurality of consecutive slabs. In this example, fulfilling module 112 may fulfill the request to store the second data segment within the container-based storage system by storing the second data segment in a second container within the plurality of containers that corresponds to the second slab in response to determining that the second data segment falls within the second slab, thereby storing the new data segment and the second data segment in different containers based on the new data segment and the second data segment falling within different slabs. To continue the example, systems described herein may (i) receive, in response to a third write operation directed to the file, a third request to store within the container-based storage system a third data segment generated by the third write operation, and (ii) determine that the third data segment falls within the specified slab within the plurality of consecutive slabs. In this continuation of the example, fulfilling module 112 may fulfill the request to store the third data segment within the container-based storage system by storing the third data segment in the designated container within the plurality of containers that was used to store the new data segment and that corresponds to the specified slab in response to determining that the third new data segment falls within the third slab, thereby storing both the new data segment and the third data segment in the specified container based on both the new data segment and the third data segment both falling within the specified slab.

Figure 6:
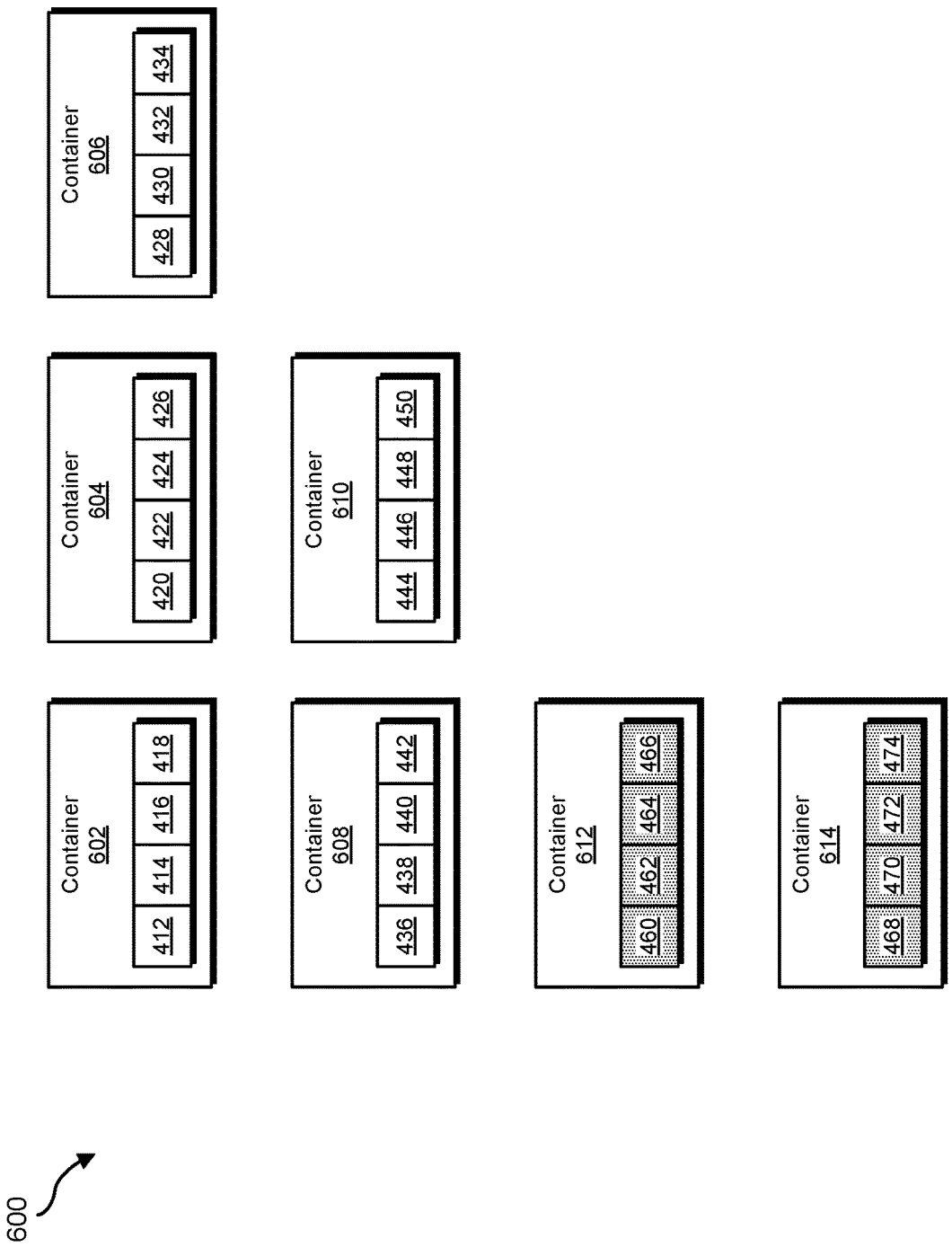
FIG. 6 is an illustration of example containers for storing data segments.
Figure 7:
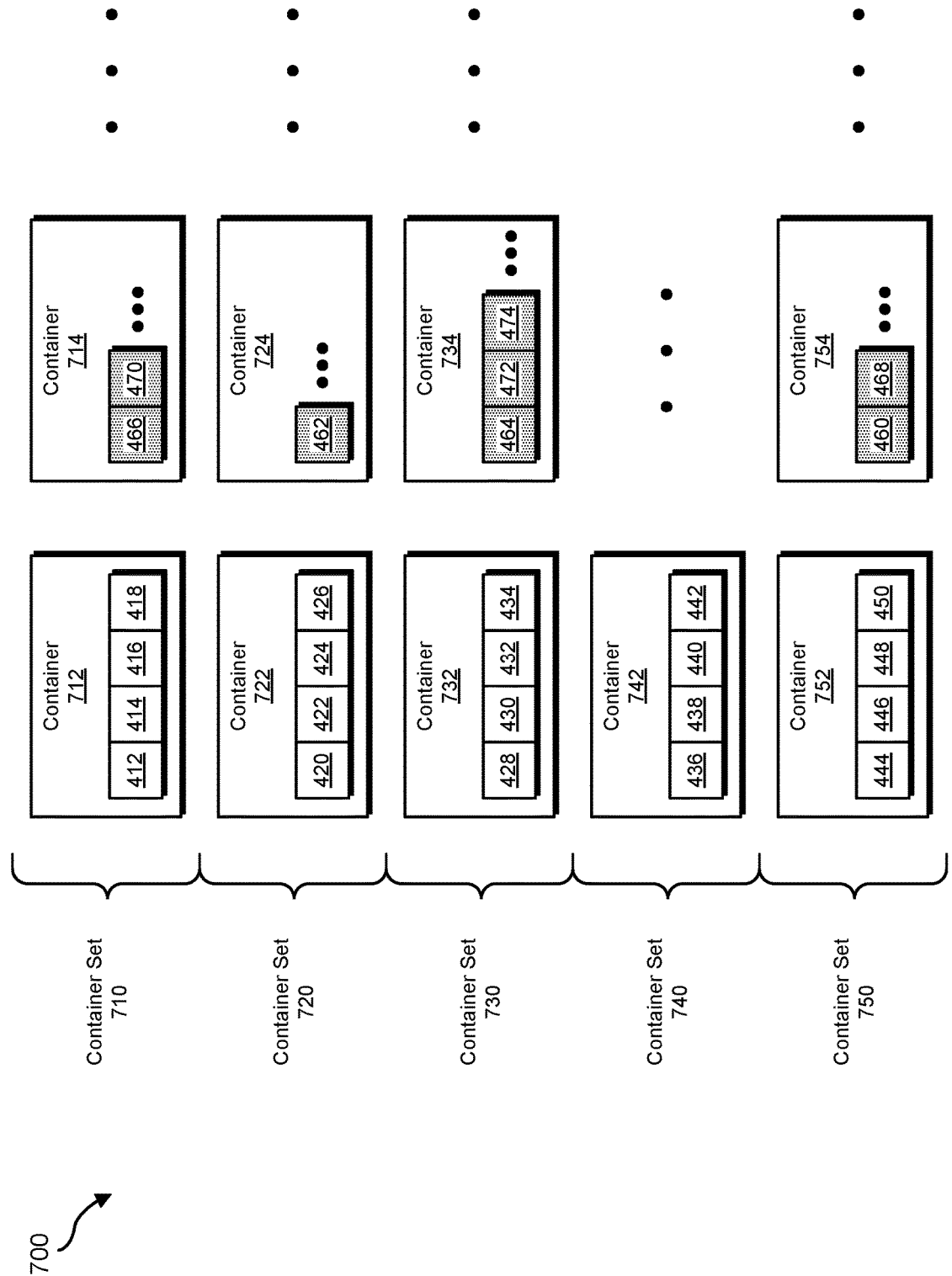
FIG. 7 is an illustration of example containers for storing data segments.

FIGS. 6 and 7 provide examples of how data segments may be distributed among containers. For example, FIG. 6 illustrates an example segment distribution 600. As shown in FIG. 6, containers 602, 604, 606, 608, 610, 612, and 614 may store various data segments (e.g., data segments written to file 400 in FIG. 4). For example, when file 400 is created as file 400(1), a container-based storage system may store the data segments in successive containers in the order in which the data segments are received (until each container reaches a maximum capacity—e.g., four data segments). Thus, the container-based storage system may store data segments 412-418 in container 602. Then, once container 602 is full, the container-based storage system may store data segments 420-426 in container 604, data segments 428-434 in container 606, and data segments 436-442 in container 608. Later, when write operations overwrite portions of file 400 (resulting in file 400(2)), the container-based storage system may store new data segments generated by the write operations in successive containers in the order in which the new data segments are received. For example, the container-based storage system may store data segments 460-466 in container 612 (despite, e.g., data segments 460-466 being widely distributed within file 400 (2) rather than closely sharing a locality). Likewise, when write operations overwrite portions of file 400 (resulting in file 400(3)), the container-based storage system may store new data segments generated by the write operations in the next available container until the container reaches maximum capacity. For example, the container-based storage system may store data segments 468-474 in container 614. By storing the data segments in this manner, however, container 612 may store scattered data segments. Likewise, container 614 may store scattered data segments. This may result in slower read operations when contiguous portions of file 400 are later read.

Using an alternative approach, FIG. 7 illustrates an example segment distribution 700. As shown in FIG. 7, containers 712, 714, 722, 724, 732, 734, 742, 752, and 754 may store various data segments (e.g., data segments written to file 400 in FIG. 4). In this example, the systems described herein may select containers in which to store new data segments based on slabs of file 400 in which the new data segments fall. For example, as shown in FIG. 5, file 400 may be divided into slabs 510, 512, 514, 516, and 518. Accordingly, new data segments written to slab 510 may be stored in a container within container set 710 (e.g., a container that is not yet filled to maximum capacity, or a new container for the container set of no existing containers have free space), new data segments written to slab 512 may be stored in a container within container set 720, and so forth, with slab 514 corresponding to container set 730, slab 516 with container set 740, and slab 518 with container set 750. \

Thus, for example, when file 400 is created as file 400(1), the systems described herein may store the data segments in containers within container sets corresponding to the slabs in which the data segments fall. Thus, data segments 412-418, falling within slab 510, may be stored in container 712 within container set 710; data segments 420-426, falling within slab 512, may be stored in container 722 within container set 720, and so forth. Later, when write operations overwrite portions of file 400 (resulting in file 400(2)), the systems described herein may store new data segments generated by the write operations in containers within container sets corresponding to the slabs in which the data segments fall. For example, the systems described herein may store new data segment 460 in container 754 based on slab 518 corresponding to container set 750. Subsequently, the systems described herein may store new data segment 462 in container 724 based on slab 512 corresponding to container set 720. By mapping new data segments to slabs and slabs to container sets, the systems described herein may proceed to store data segment 464 in container 734 and data segment 466 in container 714. Likewise, when write operations overwrite portions of file 400 resulting in file 400(3), the systems described herein may store data segment 468 in container 754, data segment 470 in container 714, and data segments 472 and 474 in container 734. As future new data segments are written to subsequent iterations of file 400, the systems described herein may fill existing containers in container sets 710, 720, 730, 740, and 750 and store new data segments in newly created containers in the existing container sets. In this manner, data segments in slab 510 may largely be found in containers within container set 710, data segments in slab 512 may largely be found in containers within container set 720, and so forth. As will be explained in greater detail below, this method of distributing data segments among containers may improve future read performance for the file.

In one embodiment, one or more of the systems described herein may (i) receive, in response to a read operation directed to the file and encompassing the new data segment, a request to retrieve the new data segment from the container-based storage system, (ii) prefetch the designated container that stores the new data segment in response to receiving the request to retrieve the new data segment and thereby caching additional data beyond the new data segment, and (iii) fulfill an additional request to retrieve an additional data segment that also falls within the specified slab and is therefore also stored within the designated container by reading from the cached additional data. Using FIGS. 4, 5, and 7 as an example, a reading module may receive a request to retrieve data segment 472 in response to a read request directed to file 400(3). In anticipation of the read operation and/or subsequent read operations requiring subsequent data segments within file 400(3), the reading module may prefetch and cache one or more containers from container set 730 (e.g., containers 732 and/or 734), because container set 730 may correspond to slab 514, which may include data segment 472, a target of the read operation. Thus, when the read operation and/or one or more subsequent read operations creates a request to retrieve subsequent data segments 430, 474, and/or 434, the data segments may be retrieved from cached containers 732 and/or 734. The systems and methods described herein may facilitate this efficiency by preserving a relationship between the special locality of data segments within a file and the containers in which the data segments are stored.

In some examples, the reading module may prefetch and cache all containers that correspond to the slab targeted by the read operation. Additionally or alternatively, the reading module may prefetch only the most recent container and/or the most recent containers (e.g., to a predetermined number) within the container set. In some examples, the reading module may prefetch the first container and the most recent containers (e.g., on the assumption that the same set of locations are likely to be the target of repeated write operations, such that the latest version of a slab is likely to most likely to disproportionately contain the oldest, original data segments in the slab and the newest data segments in the slab). In some examples, the reading module may determine how many containers to prefetch based on a priority assigned to the read operation.

In some examples, the systems described herein may store files that are small relative to the capacity of the containers used in the container-based storage system (e.g., files small enough that a single container could store data segments for multiple files). In some examples, fulfilling module 112 may store a plurality of small files that each fall below a predetermined size within a common container in the container-based storage system based on the plurality of small files falling below the predetermined size. In this manner, the systems described herein may avoid inefficiencies in writing the small files to the container-based storage system.

In some examples, fulfilling module 112 may determine whether a file is to be stored as a small file by observing the collective size of write operations directed to creating a file. For example, one or more of the systems described herein may temporarily hold write operations to a small file within the plurality of small files in a buffer, (ii) determining that a size of the small file falls below the predetermined size, and (iii) writing the small file to the common container in response to determining that the size of the small file falls below the predetermined size. Fulfilling module 112 may hold the write operations in a buffer for any suitable duration. For example, fulfilling module 112 may hold the write operations in the buffer until the file is synced, until the file is closed, and/or until the data in the buffer has become stale (e.g., as remained in the buffer for an amount of time that exceeds a predetermined threshold, as measured by the earliest entry by the file into the buffer, but the most recent entry by the file into the buffer, and/or by a formula accounting for multiple timings of entries into the buffer). In this manner, the systems described herein may have an opportunity to determine whether a file should be treated as a small file before committing to containers for storing the data segments of the file. Thus, where fulfilling module 112 determines that the size of a file exceeds the predetermined size, fulfilling module 112 may instead write the data segments to containers based on the respective slabs in which the respective data segments fall, as described in detail above.

As discussed above, in some examples the container-based storage system may operate as a deduplicated data storage system. Accordingly, in some examples a freeing module may (i) determine that the file has been removed from the deduplicated data storage system, (ii) determine that no files stored by the deduplicated data storage system reference data segments stored within the designated container, and (iii) free space allocated to the designated container in response to determining that no files stored by the deduplicated data storage system reference data segments stored within the designated container.

As explained above in connection with FIG. 3, a file system operating as a part of a copy data management system may write data in a journaling fashion. Thus, data may be broken into segments and stored in containers with a default size (e.g., 64 MB). The systems described herein may minimize the number of containers storing update for each given logical byte range of a file (e.g., a slab). Data within each slab of a file, including the initial data and any following updates, may be stored in a set of containers, where each slab has its own corresponding set of containers. Thus, the combination of file and slab may determine where data is to be stored.

With a slab size of 64 MB, the data of a file in the file logical offset range of [0, 64 MB] may fall into one container. After that, any update within offset range of [0, 64 MB] may be written into a new container until it is full. Once the second container is full, a third container may be created to store any new updates within the offset range of [0, 64 MB}. This process may continue, resulting in new container created as old containers are filled to accommodate new data stored within the range. The updates happening to the offset range of [0, 64 MB] may follow any of a variety of patterns, including randomly distributed updates and/or updates in a smaller range such as [10 MB, 20 MB].

In one example, each file may typically have at least one container. Each container may include two files (e.g., a .bhd file and a .bin file). However, such an arrangement may be inefficient for small files (e.g., an entire container dedicated to a single-byte file). Thus, the systems described herein may combine small files into a single container. In some examples, to facilitate distinct treatment of small files, the systems described herein may buffer data writes to a file before a predetermined threshold is reached. Then, when the file is synced and/or closed, and/or when the file is aged out of the buffer, the buffered data may be written into a common container shared by other small files if the file size is smaller than a predetermined file size threshold.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of."Finally, for ease of use, the terms "including" and "having" (and their derivatives), as used in the specification and claims, are interchangeable with and have the same meaning as the word "comprising."

What is claimed is:

1. A computer-implemented method for data placement in container-based storage systems, at least a portion of the method being performed by a computing device comprising at least one processor, the method comprising:
   identifying a file stored within a container-based storage system, wherein the file comprises a plurality of consecutive data segments of a logical offset address range, wherein the consecutive data segments are organized into a plurality of consecutive slabs such that each of the plurality of slabs stores at least two of the plurality of consecutive data segments, each of the plurality of consecutive slabs is stored in a corresponding container of a plurality of containers of the container-based storage system such that each of the plurality of containers stores at least two of the plurality of slabs, and the plurality of containers are organized into a plurality of container sets based on mapping each slab to a container set containing more than one of the plurality of containers;
   receiving, in response to a write operation directed to the file, a request to store within the container-based storage system a new data segment generated by the write operation;
   determining that the new data segment falls within a specified slab within the plurality of consecutive slabs corresponding to the file; and
   fulfilling the request to store the new data segment within the container-based storage system by storing the new data segment in a designated container within a container set of the plurality of container sets that is mapped to the specified slab in response to determining that the new data segment falls within the specified slab.

2. The computer-implemented method of claim 1, wherein:
   the write operation directed to the file comprises a random access write operation; and
   a data segment at a location of the new data segment was previously stored within the container-based storage system in a different container than the designated container.

3. The computer-implemented method of claim 1, further comprising:
   receiving, in response to a second write operation directed to the file, a second request to store within the container-based storage system a second new data segment generated by the second write operation;
   determining that the second new data segment falls within a second slab within the plurality of consecutive slabs corresponding to the file; and
   fulfilling the request to store the second data segment within the container-based storage system by storing the second data segment in a second container within a container set of the plurality of container sets that corresponds to the second slab in response to determining that the second data segment falls within the second slab, thereby storing the new data segment and the second data segment in different containers based on the new data segment and the second data segment falling within different slabs.

4. The computer-implemented method of claim 3, further comprising:
   receiving, in response to a third write operation directed to the file, a third request to store within the container-based storage system a third data segment generated by the third write operation;
   determining that the third data segment falls within the specified slab within the plurality of consecutive slabs corresponding to the file; and
   fulfilling the request to store the third data segment within the container-based storage system by storing the third data segment in the designated container within the container set of the plurality of container sets that was used to store the new data segment and that corresponds to the specified slab in response to determining that the third data segment falls within the specified slab, thereby storing both the new data segment and the third data segment in the designated container based on both the new data segment and the third data segment both falling within the specified slab.

5. The computer-implemented method of claim 1, further comprising:
   receiving, in response to a read operation directed to the file and encompassing the new data segment, a request to retrieve the new data segment from the container-based storage system;
   prefetching the designated container that stores the new data segment in response to receiving the request to retrieve the new data segment and thereby caching additional data beyond the new data segment; and
   fulfilling an additional request to retrieve an additional data segment that also falls within the specified slab and is therefore also stored within the designated container by reading from the cached additional data.

6. The computer-implemented method of claim 1, further comprising storing a plurality of small files that each fall below a predetermined size within a common container in the container-based storage system based on the plurality of small files falling below the predetermined size.

7. The computer-implemented method of claim 6, wherein storing the plurality of small files within the common container comprises:
   temporarily holding write operations to a small file within the plurality of small files in a buffer;
   determining that a size of the small file falls below the predetermined size; and
   writing the small file to the common container in response to determining that the size of the small file falls below the predetermined size.

8. The computer-implemented method of claim 1, wherein:
   the container-based storage system comprises a deduplicated data storage system; and
   the new data segment is stored in the designated container in response to determining that the new data segment is unique within the deduplicated data storage system.

9. The computer-implemented method of claim 8, further comprising:
   determining that the file has been removed from the deduplicated data storage system;
   determining that no files stored by the deduplicated data storage system reference data segments stored within the designated container; and
   freeing space allocated to the designated container in response to determining that no files stored by the deduplicated data storage system reference data segments stored within the designated container.

10. A system for data placement in container-based storage systems, the system comprising:
- an identification module, stored in memory, that identifies a file stored within a container-based storage system, wherein the file comprises a plurality of consecutive data segments of a logical offset address range, wherein the consecutive data segments are organized into a plurality of consecutive slabs such that each of the plurality of slabs stores at least two of the plurality of consecutive data segments, each of the plurality of consecutive slabs is stored in a corresponding container of a plurality of containers of the container-based storage system such that each of the plurality of containers stores at least two of the plurality of slabs, and the plurality of containers are organized into a plurality of container sets based on mapping each slab to a container set containing more than one of the plurality of containers;
- a receiving module, stored in memory, that receives, in response to a write operation directed to the file, a request to store within the container-based storage system a new data segment generated by the write operation;
- a description module, stored in memory, that describes the file in terms of the plurality of consecutive slabs;
- a determination module, stored in memory, that determines that the new data segment falls within a specified slab within the plurality of consecutive slabs corresponding to the file;
- a fulfilling module, stored in memory, that fulfils the request to store the new data segment within the container-based storage system by storing the new data segment in a designated container within a container set of the plurality of container sets that is mapped to the specified slab in response to determining that the new data segment falls within the specified slab; and
- at least one physical processor configured to execute the identification module, the receiving module, the description module, the determination module, and the fulfilling module.

11. The system of claim 10, wherein:
the write operation directed to the file comprises a random access write operation; and
a data segment at a location of the new data segment was previously stored within the container-based storage system in a different container than the designated container.

12. The system of claim 10, wherein:
the receiving module further receives, in response to a second write operation directed to the file, a second request to store within the container-based storage system a second new data segment generated by the second write operation;
the determination module further determines that the second new data segment falls within a second slab within the plurality of consecutive slabs corresponding to the file; and
the fulfilling module further fulfills the request to store the second data segment within the container-based storage system by storing the second data segment in a second container within a container set of the plurality of container sets that corresponds to the second slab in response to determining that the second data segment falls within the second slab, thereby storing the new data segment and the second data segment in different containers based on the new data segment and the second data segment falling within different slabs.

13. The system of claim 12, wherein:
the receiving module further receives, in response to a third write operation directed to the file, a third request to store within the container-based storage system a third data segment generated by the third write operation;
the determination module further determines that the third data segment falls within the specified slab within the plurality of consecutive slabs corresponding to the file; and
the fulfilling module further fulfills the request to store the third data segment within the container-based storage system by storing the third data segment in the designated container within the container set of the plurality of container sets that was used to store the new data segment and that corresponds to the specified slab in response to determining that the third data segment falls within the specified slab, thereby storing both the new data segment and the third data segment in the designated container based on both the new data segment and the third data segment both falling within the specified slab.

14. The system of claim 10, further comprising a reading module, stored in memory, that:
receives, in response to a read operation directed to the file and encompassing the new data segment, a request to retrieve the new data segment from the container-based storage system;
prefetches the designated container that stores the new data segment in response to receiving the request to retrieve the new data segment and thereby caching additional data beyond the new data segment; and
fulfills an additional request to retrieve an additional data segment that also falls within the specified slab and is therefore also stored within the designated container by reading from the cached additional data.

15. The system of claim 10, wherein the fulfilling module further stores a plurality of small files that each fall below a predetermined size within a common container in the container-based storage system based on the plurality of small files falling below the predetermined size.

16. The system of claim 15, wherein the fulfilling module stores the plurality of small files within the common container by:
temporarily holding write operations to a small file within the plurality of small files in a buffer;
determining that a size of the small file falls below the predetermined size; and
writing the small file to the common container in response to determining that the size of the small file falls below the predetermined size.

17. The system of claim 10, wherein:
the container-based storage system comprises a deduplicated data storage system; and
the new data segment is stored in the designated container in response to determining that the new data segment is unique within the deduplicated data storage system.

18. The system of claim 17, further comprising a freeing module that:
determines that the file has been removed from the deduplicated data storage system;
determines that no files stored by the deduplicated data storage system reference data segments stored within the designated container; and
frees space allocated to the designated container in response to determining that no files stored by the deduplicated data storage system reference data segments stored within the designated container.

19. A non-transitory computer-readable medium comprising one or more computer-readable instructions that, when executed by at least one processor of a computing device, cause the computing device to:
   identify a file stored within a container-based storage system, wherein the file comprises a plurality of consecutive data segments of a logical offset address range, wherein the consecutive data segments are organized into a plurality of consecutive slabs such that each of the plurality of slabs stores at least two of the plurality of consecutive data segments, each of the plurality of consecutive slabs is stored in a corresponding container of a plurality of containers of the container-based storage system such that each of the plurality of containers stores at least two of the plurality of slabs, and the plurality of containers are organized into a plurality of container sets based on mapping each slab to a container set containing more than one of the plurality of containers;
   receive, in response to a write operation directed to the file, a request to store within the container-based storage system a new data segment generated by the write operation;
   determine that the new data segment falls within a specified slab corresponding to the file; and
   fulfill the request to store the new data segment within the container-based storage system by storing the new data segment in a designated container within a container set of the plurality of container sets that is mapped to the specified slab in response to determining that the new data segment falls within the specified slab.

20. The non-transitory computer-readable medium of claim 19, wherein:
   the write operation directed to the file comprises a random access write operation; and
   a data segment at a location of the new data segment was previously stored within the container-based storage system in a different container than the designated container.

* * * * *